Oct. 4, 1955
C. D. HOBSON
2,719,404
HYDRAULIC SAFETY UNIT
Filed Aug. 30, 1952
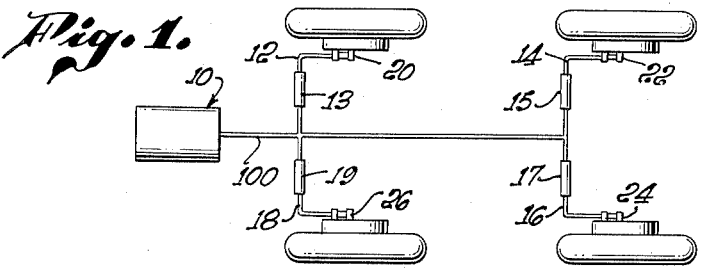
*Fig. 1.*
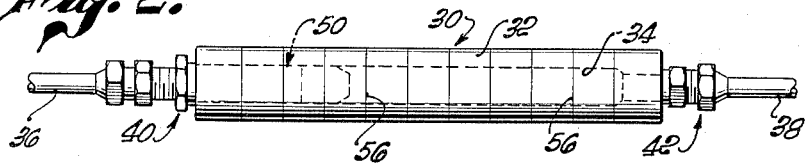
*Fig. 2.*
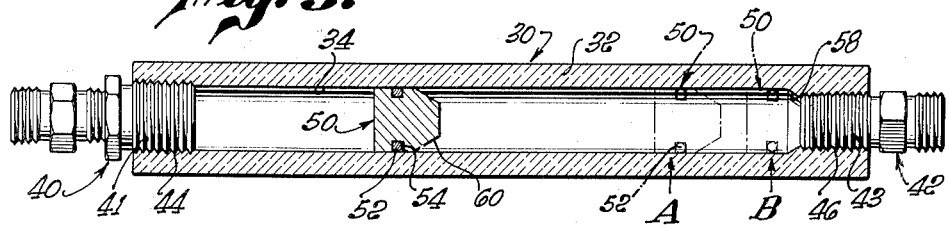
*Fig. 3.*
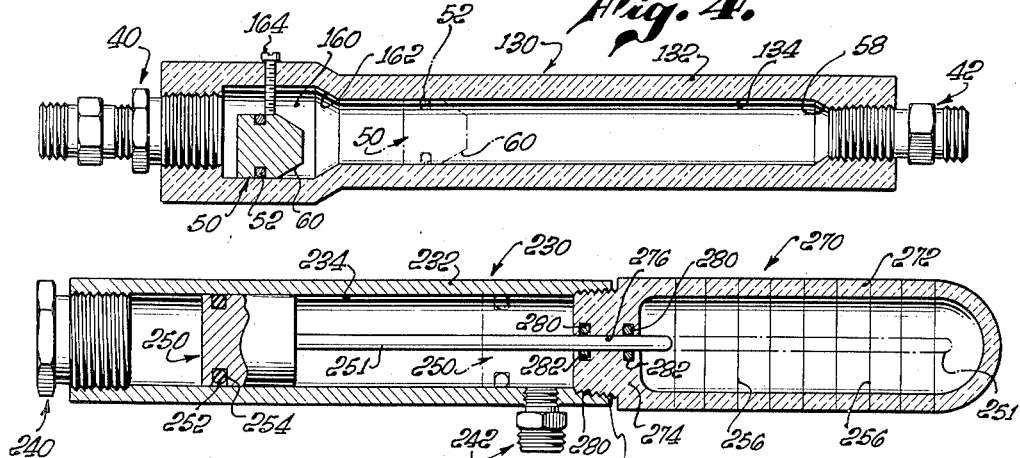
*Fig. 4.*
*Fig. 5.*
CLIFFORD D. HOBSON,
INVENTOR.
BY
ATTORNEY.

United States Patent Office 2,719,404
Patented Oct. 4, 1955

2,719,404

HYDRAULIC SAFETY UNIT

Clifford D. Hobson, Orange, Calif.

Application August 30, 1952, Serial No. 307,272

5 Claims. (Cl. 60—54.5)

This invention relates generally to a safety device to be used in a hydraulic system and is particularly adapted for use in the hydraulic brake system of a vehicle and similar installations where only limited movement is to be transferred from a master point in the system to one or more controlled or slave units.

As is well known, failure of the hydraulic line or conduit leading to a hydraulic brake in a vehicle is not uncommon. Such failure may be caused by corrosion of the line, vibration transmited to the line by movement of the vehicle, abrasion of the line by contact with other parts of the vehicle, and by other causes. In the conventional hydraulic brake system of a vehicle, the failure of a hose or conduit leading to one wheel immediately causes complete failure of the entire system since the fluid of the system cannot be compressed when one point in the system is open. Thus failure of a single point in the hydraulic system renders all brakes controlled by the system inoperative, and the danger and damage potentially resulting from such condition are obvious.

An additional disadvantage in the conventional hydraulic brake system results from a slow and almost imperceptible leakage of fluid from a hose or conduit in the system. Typically, the operator of a vehicle having such a leak is unaware of the condition developing. When an emergency situation arises and he must quickly stop his vehicle, he is unable to do so because the quantity of liquid within the system has diminished so that insufficient force is transmitted to the brake-energizing cylinders.

The present invention provides a solution to the above problems in a simple but reliable way and has for its principal object the provision of a novel safety unit for use in a hydraulic force-transmitting system.

Another object is to disclose a safety device affording a continuously visible indication of the condition of each slave unit and connections thereto.

A further object is to provide a device of the above character including means for isolating from a hydraulic system a slave unit where failure has occurred.

Yet another object is to provide a device of the character referred to including means for facilitating the charging, adjusting and bleeding of a hydraulic system.

Another object is to disclose a safety device well adapted to be installed in an existing hydraulic brake system without the necessity of making extensive changes in the system.

A further object is to disclose a device having the above advantages which is rugged and reliable in operation and yet is inexpensive to manufacture and install.

These and other and allied objects and purposes of the invention will become clear from a study of the following description of preferred embodiments thereof taken in connection with the accompanying drawing in which:

Fig. 1 is a schematic diagram of the hydraulic brake system of a vehicle showing four typical installations of the devices of the present invention.

Fig. 2 is a view of a preferred form of the safety unit of my invention together with fragmentary portions of hydraulic lines or conduits attached to each end of the unit.

Fig. 3 is a vertical sectional view, on an enlarged scale, of the device of Fig. 2 with the piston shown in normal position in solid lines and in other positions in dotted outline.

Fig. 4 is a vertical sectional view of a modified form of my invention with the piston shown in solid lines in position for charging, adjusting or bleeding the system, and in dotted outline in opeartive position.

Fig. 5 is a sectional view of an alternative form of my invention, the piston being shown in normal, operative position in solid lines and in inopeartive position in dotted outline.

Generally speaking, the safety unit of my invention includes an elongated tubular body member having conduit connecting means at each end and adapted to be installed in each conduit or line leading to a wheel cylinder in a braking system. The safety unit proper is made of rigid impermeable material and is preferably made transparent or at least translucent for reasons which will appear hereinafter. Suitable synthetic compositions may be used in the construction of the body member such as nylon or material having similar physical properties and being resistant to corrosion by the liquid used in the hydraulic system.

Within the tubular body member and slidable therein is a piston or plug which is provided with suitable means for maintaining sealing contact with the inside wall of the body member. Such piston or plug may be made of any suitable corrosion-resistant material such as metal or a synthetic composition such as Bakelite or the like. At one end of the tubular body member there is formed an inwardly directed tapered valve seat against which, under certain conditions, the plug will abut and wedge in position. In this latter condition the plug is restrained from further movement in either direction and no fluid can pass through the tubular body member.

In a modified form of the invention a recess is provided at one end of the tubular body forming an enlarged chamber, and means are provided for retaining the piston in the chamber while the hydraulic system is being charged or adjusted. Release of the retaining means permits the piston to enter the axial bore of the tubular body and thereafter to operate as in the first form of the invention.

In a further modified form of the invention the tubular body may be opaque, and an indicator rod is carried by the slidable piston and projects outwardly of the tubular body. Preferably means are provided by which the extent to which the rod projects may be measured, and the condition of the particular slave unit and conduit connection thereto may thus be visually ascertained.

Referring now in detail to the drawing, Fig. 1 shows, in diagrammatic form, a hydraulic braking system as used in a four-wheeled vehicle. A master cylinder 10 is connected by hydraulic conduits 12, 14, 16 and 18 to the slave units or wheel brake cylinders 20, 22, 24 and 26 respectively. The entire system is filled with a non-compressible liquid. Pressure exerted upon the liquid in the master cylinder, as by a brake pedal (not shown), is transmitted through the conduits equally to all of the wheel brake units, thus applying the brakes and stopping the vehicle. A safety unit according to the present invention is installed in each of the conduits or lines as at 13, 15, 17 and 19. As will be readily understood, the construction of master cylinder 10 and of wheel brake cylinders 20, 22, 24 and 26 is conventional in every respect, is well known in the art and is hence not shown herein in detail since it forms no part of the present invention.

In Figs. 2 and 3 is shown a safety unit of my invention indicated generally at 30. The unit 30 includes an elongated, tubular body member 32 having an axial bore 34 extending the greater part of its length. At each end of body 32 means are provided for affording connection to hydraulic lines 36 and 38, such means in the present illustration taking the form of conventional fittings made of brass or the like and indicated generally at 40 and 42 respectively. Fittings 40 and 42 are provided with external threads 41 and 43 respectively and may be engaged with internal threads 44 and 46 forming inlet and outlet ports of tubular body 32, these threaded connections being made to be hermetically tight. Hydraulic line 36 of Fig. 2 is assumed to be connected to a master cylinder such as that indicated diagrammatically at 10 in Fig. 1, while the opposite hydraulic line 38 is assumed to be connected to a slave unit such as one of the wheel brake cylinders 20, 22, 24 or 26 of Fig. 1. Thus fluid force is transmitted through safety unit 30 from left to right as viewed in the figures.

Within tubular body 32 and slidably mounted in axial bore 34 thereof is a piston or plug indicated generally at 50. The piston is mounted in sealing contact with bore 34, such contact being maintained by suitable means such as O-ring 52 carried in peripheral groove 54 of piston 50.

As mentioned hereinabove, body member 32 may desirably be made of translucent or transparent material, and when this is the case, I prefer to provide a number of calibrating indicia on the outer surface of body 32. Such indicia may take the form of circumferential lines 56 etched, scribed or otherwise permanently fixed to the body. Reference to Fig. 2 will show how the piston 50 is visible within body 32, and how its location longitudinal of the body may be measured relative to the calibrating indicia 56.

Adjacent outlet fitting 42 I may provide in bore 34 an inwardly directed tapered valve seat 58 extending around the inner periphery of the bore. Piston 50 is provided with a complementary tapered portion 60 facing valve seat 58 and under certain conditions to be described hereinafter, piston 50 may assume the position indicated in dotted outline at B in Fig. 3. Under such conditions tapered portion 60 of piston 50 is in wedging, sealing relationship with tapered seat 58, and no liquid can move in either direction through body 32.

A modified form of the invention is illustrated in Fig. 4, wherein a safety unit 130 includes a tubular body 132 having an axial bore 134 extending the greater part of its length. At the end of the body 132 adjacent fitting 40 there is a recess portion forming an enlarged chamber 160 merging with bore 134 at tapered portion 162. Means are provided for selectively retaining piston 50 in chamber 160, such means in the present illustration taking the form of radial set screw 164 threadedly received in the side wall of body 132 defining chamber 160. With the parts in position as shown in full lines in Fig. 4, piston 50 does not interfere with the free flow of liquid from inlet fitting 40, through chamber 160 and axial bore 134 and through outlet fitting 42. Thus the hydraulic system of which safety unit 130 is a part may be charged, adjusted and bled in the conventional manner. When the system is ready to be put into use, set screw 164 is loosened thus releasing piston 50. The piston is then caused to move into axial bore 134 to the position shown in dotted outline, and thereafter the device of Fig. 4 operates in the same manner as that of Figs. 2 and 3. Movement of piston 50 to its operative position is brought about by bleeding a small quantity of fluid from the slave unit or wheel brake cylinder connected to outlet fitting 42, as will be readily understood.

An alternative form of the invention is shown in Fig. 5 wherein a safety unit indicated generally at 230 includes a tubular body member 232. Body 232 may be made of metal or the like and may be opaque. An inlet fitting 240 is threadedly received in one end of body 232, and an outlet fitting 242 is threadedly received in the side wall of body 232 adjacent the opposite end. A piston 250 is slidably mounted in axial bore 234 of body 232 and is preferably provided with means for hermetically engaging the bore 234 such as O-ring 252 in groove 254.

An indicator rod 251 extends longitudinally from piston 250 and may be formed integrally with the piston or may be fixed thereto by threaded engagement or other suitable means. A cover indicated generally at 270 includes a hollow bulb-like envelope 272 and a relatively thick base 274 having a longitudinal channel 276. Cover 270 is attached to tubular body member 232 by suitable preferably removable means such as by external threads 278 formed on base 274 engaging internal threads 280 formed in the end of body 232. Cover 270 is transparent and may be made of any suitable rigid material. Although glass might be satisfactory, I prefer to use a synthetic composition such as a polystyrene or the like, which is conveniently formed into desired shapes and is relatively unbreakable.

When the parts are assembled as shown in Fig. 5, indicator rod 251 extends through channel 276 and packing means are provided to prevent leakage of liquid from body 232 into envelope 272 of cover 270. Such means are here shown as including O-rings 280 carried in recessed peripheral grooves 282 surrounding channel 276. Calibrating indicia are provided on envelope 272, such indicia being here shown as circumferential lines 256 etched or otherwies inscribed in the outer surface of the transparent envelope.

In operation, the hydraulic system in which my safety unit is to be used is charged and adjusted for normal operation. The system may be bled at various points in known manner so that the piston 50 or 250 assumes its normal position as shown in solid lines in Figs. 3 and 5 and in dotted outline in Fig. 4. Thereafter, normal operation of the brake system will cause the piston to move rightwardly as seen in the several views, such movement being relatively slight if the system is functioning properly and there are no leaks. When force on the liquid is released in the master cylinder, as by release of the brake pedal, the piston returns to its normal position.

If there is a small leak in one of the slave units, then the piston in the safety unit connected to that slave unit will not return completely to its normal position upon release of the brake pedal. Instead, it will return to a new position displaced slightly rightwardly from its former position by an amount corresponding to the quantity of liquid lost in the leak. Assuming that the leak continues, successive operations of the brake pedal will continue to displace the "return" position of the piston rightwardly from its original position until eventually it may assume a "return" position as shown at A in Fig. 3. As a result, visual inspection at periodic intervals by maintenance or service personnel will detect the changed position of the piston when the system is at rest, since the position of the piston can be readily ascertained by reference to the calibrating indicia 56 or 256.

In case of a sudden complete failure of a slave unit, as by an opening in the conduit leading to such unit, the next application of force to the system by actuation of the brake pedal will cause the piston in the safety unit connected to the faulty slave unit to be driven rightwardly as seen in the figures until it assumes the position shown at B in Fig. 3 or that shown in dotted outline in Fig. 5. Under such conditions no further movement of the piston can occur, and it will be seen that liquid within body 32 or 232 is prevented from further movment. Thus the particular slave unit which has failed is isolated from the system, and remaining slave units will continue to be controlled by the liquid force produced in the system by the master cylinder in conventional manner.

In addition to visually indicating the condition of a slave unit and the connections thereto, the safety unit of the present invention is also adapted to visually indicate a leak or faulty operation of the master cylinder itself. As is readily understood, when a properly adjusted hydraulic brake system is at rest, a certain predetermined minimum fluid pressure exists throughout the system. Such pressure conventionally may be in the range of two to ten pounds per square inch, and is maintained at the predetermined value by suitable means in the master cylinder well known in the art. If such means fail, or if there is leakage of liquid between the master cylinder and a safety unit of the present invention, then the piston of the safety unit will not assume its normal "return" position when the system is at rest. Instead, the piston will assume a position displaced slightly leftwardly (as viewed in the figures herein) of its former position and continued loss of liquid pressure in or adjacent the master cylinder will increase such leftward displacement. This can of course be readily seen during periodic maintenance inspections, and proper corrective measures taken.

In order to facilitate the ascertaining of a leak or other failure of the above character in the master cylinder, one of the present safety units may advantageously be installed in the conduit leading directly from the master cylinder, say at the position indicated at 100 in Fig. 1. The piston of such safety unit will indicate, by its position when the system is at rest, not only the condition of the master cylinder but also that of all other elements of the hydraulic system. This is so because any imbalance from the normal, predetermined pressure which should exist in the system will be manifested by a displacement of the piston of such a unit from its normal position. Desirably a safety unit at point 100 in the system should be physically positioned in the vehicle to be readily visible to the operator at all times. The dashboard or control panel in the operator's compartment is very satisfactory for such location. Any malfunctioning indicated by a safety unit thus positioned can be immediately investigated by inspection of the other safety units in the system and the fault thus quickly found.

The safety unit of the present invention may be advantageously used in periodic adjustment of brakes. In order to compensate for the gradual wear of the frictional lining on brake shoes, it is necessary from time to time to adjust the shoes so that the clearance from lining surface to brake drum, when the system is at rest, is some predetermined normal value, typically of the order of 0.020 inch. The adjustment is effectuated by means including a cam, eccentric mechanism or equivalent well known in the art. Since the fluid used in a hydraulic brake system is virtually non-compressible, adjustment of the normal position of a brake shoe and its actuating piston causes a corresponding change in the position of the piston of the safety unit connected to that wheel cylinder or slave unit. Thus a brake shoe and lining may be adjusted into touching contact with its drum and the position of the piston of its safety unit is noted. The brake shoe is then retracted until the piston of its safety unit indicates, by its movement from the noted position, that the clearance between brake lining and drum is the desired distance, say 0.020 inch. It is obvious that, the dimensions of the several parts being known, a movement of the safety unit piston of some calculable amount from its noted position indicates that a movement of the brake shoe and lining through the desired distance has occurred.

Although no continuous flow of liquid takes place in a safety unit of the present invention, nevertheless for clarity and conciseness of terminology the terms "upstream" and "downstream" when used herein will be understood to refer to the direction of momentary movement of liquid during application of force to the liquid of the master cylinder. Thus downstream movement of liquid or of the piston corresponds to rightward movement as viewed in the present figures; the inlet port is upstream of the normal position of the piston and the outlet port is downstream thereof.

Accordingly it will be seen that there is provided a simple yet reliable safety unit for use in a hydraulic force-transmitting system and especially adapted to be used in a hydraulic brake system for vehicles. It is emphasized that the embodiments herein referred to are illustrative only and are not to be construed in a limiting sense. Many modifications and changes from the illustrative forms of the invention herein shown and described will occur to those skilled in the art, and all such modifications and changes not departing from the spirit of the invention are intended to be embraced within the scope of the appended claims.

I claim:

1. A safety unit adapted to be connected between a master unit and a slave unit in a hydraulic force-transmitting system comprising: a rigid, impermeable, elongated body having a longitudinal bore therein and an outlet port and an inlet port communicating with said bore at longitudinally spaced points thereof; a piston slidable within said bore and in hermetic engagement therewith, said piston normally assuming a position between said ports; said body including an enlarged chamber in said bore upstream of the normal position of said piston, and means operable from without the body for selectively retaining the piston in the chamber; and an inwardly directed tapered peripheral seat formed in the body concentric with said bore and downstream of the normal position of said piston, the downstream face of the piston being provided with a complementarily tapered portion for wedging engagement with said seat.

2. A hydraulic safety unit comprising: an elongated tubular body of rigid impermeable material having an inlet port, an outlet port and a longitudinal bore communicating said ports, the bore including an enlarged recessed chamber spaced from said outlet port; a piston slidably mounted in said bore including means for hermetically sealing said piston within said bore, the piston normally assuming a position in said bore between the outlet port and the enlarged chamber, the piston being adapted, selectively, to be wholly housed in said chamber; and means operable from without the chamber for selectively retaining the piston in the chamber.

3. A safety unit as stated in claim 2 wherein said retaining means includes a rotatable member disposed transversely of the body and threadedly engaged in the wall of the chamber.

4. A safety unit as stated in claim 3 wherein said body is provided with an inwardly directed tapered peripheral seat concentric with said bore and downstream of the normal position of said piston, the downstream face of the piston being provided with a complementarily tapered portion for wedging engagement with said seat.

5. A safety unit as stated in claim 2 wherein said body is provided with an inwardly directed tapered peripheral seat concentric with said bore and downstream of the normal position of said piston, the downstream face of the piston being provided with a complementarily tapered portion for wedging engagement with said seat.

References Cited in the file of this patent

UNITED STATES PATENTS

| | | |
|---|---|---|
| 430,089 | Sewall | June 10, 1890 |
| 940,689 | Hodgkinson | Nov. 23, 1909 |
| 1,790,044 | Francis | Jan. 27, 1931 |
| 1,831,081 | Smith | Nov. 10, 1931 |
| 2,077,646 | Snyder | Apr. 20, 1937 |
| 2,090,273 | Wagner | Aug. 17, 1937 |
| 2,093,015 | Madden | Sept. 14, 1937 |
| 2,238,124 | Mathieson | Apr. 15, 1941 |
| 2,245,682 | Kerr | June 17, 1941 |
| 2,496,623 | Fragale | Feb. 7, 1950 |
| 2,515,956 | Greenberg | July 18, 1950 |
| 2,561,273 | Hamilton | July 17, 1951 |
| 2,571,963 | Stelzer | Oct. 16, 1951 |